United States Patent
Zhu et al.

(10) Patent No.: US 8,063,619 B2
(45) Date of Patent: Nov. 22, 2011

(54) SYSTEM AND METHOD FOR POWERING AN INFORMATION HANDLING SYSTEM IN MULTIPLE POWER STATES

(75) Inventors: Guangyong Zhu, Austin, TX (US);
Merle J. Wood, Round Rock, TX (US);
Joseph A. Clegg, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 405 days.

(21) Appl. No.: 12/254,489

(22) Filed: Oct. 20, 2008

(65) Prior Publication Data

US 2010/0096924 A1  Apr. 22, 2010

(51) Int. Cl.
*G05F 1/00* (2006.01)
(52) U.S. Cl. ............ 323/282; 323/266; 323/284
(58) Field of Classification Search .......... 323/282, 323/284, 285, 349, 351, 265–267
See application file for complete search history.

(56) References Cited

U.S. PATENT DOCUMENTS

| | | | |
|---|---|---|---|
| 5,991,168 A * | 11/1999 | Farrington et al. | 363/16 |
| 6,448,746 B1 | 9/2002 | Carlson | |
| 6,650,096 B2 | 11/2003 | Lee | |
| 6,836,417 B2 * | 12/2004 | Hiraki et al. | 323/268 |
| 6,940,261 B1 | 9/2005 | Umminger | |
| 7,164,258 B2 | 1/2007 | Umminger | |
| 2009/0326624 A1 * | 12/2009 | Melse | 607/116 |

* cited by examiner

*Primary Examiner* — Adolf Berhane
*Assistant Examiner* — Emily Pham
(74) *Attorney, Agent, or Firm* — Hamilton & Terrile, LLP; Robert W. Holland

(57) ABSTRACT

Power is supplied to an information handling system chipset with a single voltage regulator having dual phases. A first phase of the voltage regulator provides power to a low power state power rail in an independent mode to support a low power state, such as a suspend or hibernate state. A second phase of the voltage regulator provides power to a run power state power rail in combination with the first phase by activation of a switch, such as a MOSFET load switch, that connects the low power state power rail and the run power state power rail. Voltage sensed from both power rails is applied to control voltage output so that the run power state power rail is maintained within more precise constraints than the low power state power rail.

6 Claims, 4 Drawing Sheets

SYSTEM AND METHOD FOR POWERING AN INFORMATION HANDLING SYSTEM IN MULTIPLE POWER STATES

BACKGROUND OF THE INVENTION

1. Field of the Invention

The present invention relates in general to the field of information handling system power subsystems, and more particularly to a system and method for powering an information handling system in multiple power states.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Portable information handling systems have gained widespread acceptance among consumers as a replacement for desktop systems. Portable information handling systems integrate into a common housing a display, such as an LCD, power source, such as a battery, and I/O devices, such as a keyboard, mouse and wireless network interface card. Integration of these devices allows a portable information handling system to operate free from physical assets, such as peripheral display devices and external AC power sources. One difficulty that accompanies portable information handling system use is that the internal battery power source has a limited charge so that continuous operation of the system requires periodic recharge of the battery with an external AC-to-DC adapter. In an attempt to reduce power consumption, portable information handling systems typically employ a variety of low power states that reduce power consumption. Four common power states used by information handling systems are an on state (S0) with full power applied to all components, a standby or suspend state (S3) with power applied to RAM to maintain an active operating system for rapid power-up to the on state, a hibernate state (S4) where the active operating system and open data files stored on a hard disk drive for essentially zero power consumption and allows for a quick power-up to an on state, and an off state (S5) with no power applied. In order to save power in the standby and hibernate states, power supply rails are typically turned off in those power states to at least some components. For example, the chipset receives different amounts of power based on the power state of the information handling system.

FIG. 1 depicts an example of a conventional voltage regulator that supports reduced power states in supplying power to a chipset. A "run" power rail is active along with a "suspend" power rail when the information handling system is in an S0 "on" power state. A MOSFET load switch PQ5 prevents load current passing to components on the "run" power rail when the information handling system is in a reduced power state while load current continues to a "suspend" or "reduced power state" power rail. Typically, each power rail is built in one of plural planes of a printed circuit board, such as a motherboard. Newer generation portable CPU chipset current requirements have increased to as much as 25 Amps on some "run" rails while voltage tolerances have tightened from +/−5% to +/−2%. Therefore, for example, a 1.1 Volt rail only allows +/−22 mVolts of variation over a load range of 25 Amps as compared with previous generation variations of +/−55 mVolts. The combination of higher output and tighter tolerances has made the use of a MOSFET switch PQ5 as depicted in FIG. 1 impractical since even a high quality 2.5 mOhm MOSFET will drop 63 mVolts over a 25 Amp load range. In addition, such a MOSFET dissipates greater than 1.5 Watts of power, which increases power consumption and MOSFET thermal concerns. To avoid the use of MOSFET load switches, industry has shifted to the use of two independent switching voltage regulators as depicted in FIG. 2. A single phase voltage regulator supports a suspend reduced power state by providing power to a suspend rail while an independent two phase voltage regulator provides power to a run power rail. The 25 Amp run requirement requires the use of a two phase voltage regulator so that adequate power and load regulation are available and so that an acceptable regulator efficiency may be achieved in order to meet thermal design requirements.

SUMMARY OF THE INVENTION

Therefore a need has arisen for a system and method which provides power to an information handling system in multiple power states while using a single voltage regulator controller to connect different power planes that require the same output voltage levels.

In accordance with the present invention, a system and method are provided which substantially reduce the disadvantages and problems associated with previous methods and systems for providing power to information handling systems. A dual phase voltage regulator has a first phase that operates independently to power a reduced power state power rail and a second phase that operates in combination with the first phase to power both the reduced power state power rail and a run state power rail. For instance, when both the first and second phases are turned on, two separate power planes are combined. Combined operation of the two phases, such as by combining two different power planes of a motherboard, is achieved by closing a switch that selectively interfaces the reduced power state power rail and the run power state power rail during a run power state and opens to disconnect and shut down the run state power rail from the reduced power state power rail upon a transition to a reduced power state.

More specifically, an information handling system has plural electronic components that cooperate to process information, such as a CPU, RAM, a hard disk drive, embedded controller and a chipset. The chipset and/or embedded controller includes firmware instructions, such as a BIOS, that coordinates cooperation between the electronic components at a physical level. The chipset is powered with a reduced power state power rail that powers portions of the chipset in reduced power states, such as a suspend power state, and a run power state power rail that powers portions of the chipset in a run power state. Power is applied to the reduced power state power rail through a first phase of a two phase voltage regulator that operates in an independent mode during reduced power states. Power is applied to both the reduced power state power rail and the run power state power rail in a combination mode when the information handling system operates in a run power state. The combination mode has power applied from both phases of the voltage regulator with the reduced power state power rail and the run state power rail connected to each other by closing a MOSFET load switch. A voltage sense line from the reduced power state power rail and a voltage sense line from the run power state power rail are monitored by the voltage regulator controller to maintain the required voltage regulation limits at each power rail. In the combination mode, voltage to the run power state power rail is maintained in more precise constraints than voltage to the reduced power state power rail by multiplexing or weighting the sense lines to achieve proper output voltage regulation on both rails independent of the mode selection, such as less precise constraints for the voltage of the reduced power state power rail and more precise constraints for the voltage of the run power rail.

The present invention provides a number of important technical advantages. One example of an important technical advantage is that multiple power states on different power planes are supported with a single voltage regulator controller so that the cost, size and power consumption of the information handling system are all reduced. System cost is decreased by the use of fewer voltage regulator controllers and capacitors. System size and weight are reduced with a reduced number of voltage regulator controllers, inductor foot print size and capacitors that have a smaller footprint at the motherboard. For instance, in one example embodiment, 170 mm$^2$ less component space is needed and 3 grams of weight savings are realized. Carrying only a portion of total current, such as 9 Amps instead 25 Amps, puts much less power and thermal stress on a load switch, such as PQ6 of FIG. 4. Further, power loss across the MOSFET load switch is reduced where the portion of the current associated with the run rail operation is reduced because only a part of the current provided to a run power state power rail passes through the MOSFET switch.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Selectively interfacing outputs from first and second phases of a two phase voltage regulator allows power supply to an information handling system chipset in reduced power and run power states. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 3:
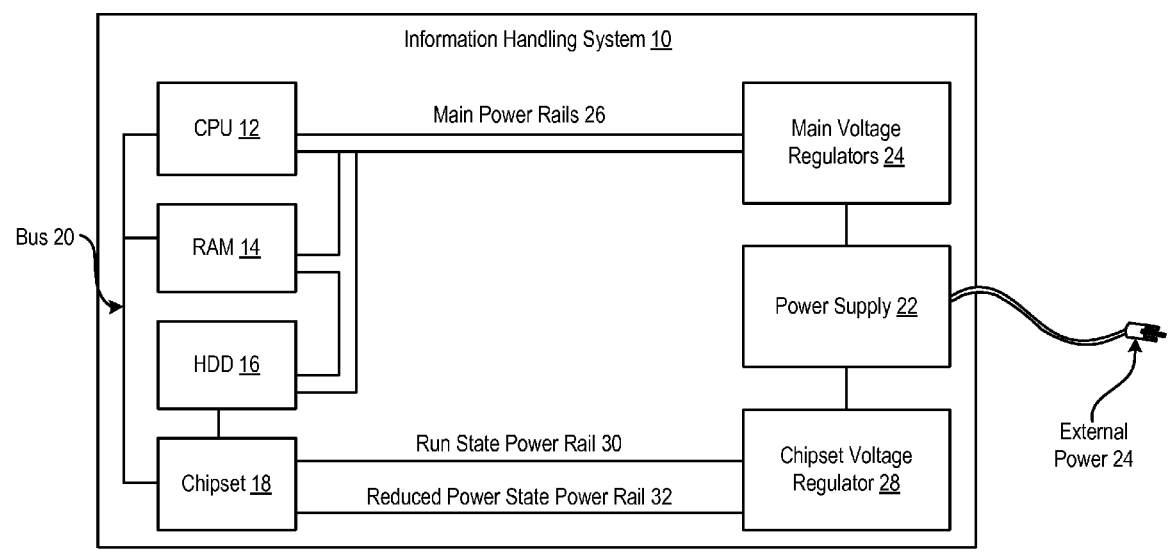
FIG. 3 depicts a block diagram of an information handling system supporting power supply to a chipset in suspend and run power modes.

Referring now to FIG. 3, a block diagram depicts an information handling system 10 supporting power supply to a chipset in suspend and run power modes. Information handling system 10 processes information with a plurality of electronic components, such as a CPU 12 that process information, RAM 14 that stores information, a hard disk drive 16 that stores information and a chipset 18 that coordinates operations of the electronic components through a main bus 20. For example, chipset 18 includes firmware instructions that initiate boot at power up and manages operations of components in various power modes. For instance, during an S0 run mode, the components have power to operate in a normal fashion while various reduced power modes have power applied to less than all the components to save power, such as the S3-S5 modes of suspend, sleep and hibernate. In alternative embodiments, instructions running on an embedded controller, also known as a keyboard controller, may be used to manage the power modes. A power supply 22 receives power from an external power source 24 and converts the external power to a direct current for use by the electronic components. Power supply 22 provides power to a number of voltage regulators, such as main voltage regulators 24, which provide power through main power rails 26 to operate the electronic components. Power supply 22 also provides power to a chipset voltage regulator 28 which provides power to chipset 18 through a run state power rail 30 and a reduced power state rail 32. When information handling system 10 operates in a reduced power state, power is provided through reduced power state power rail 32 but not through run state power rail 30. When information handling system 10 operates in a run state, power is provided through both reduced power state power rail 32 and run state power rail 30.

Figure 1:
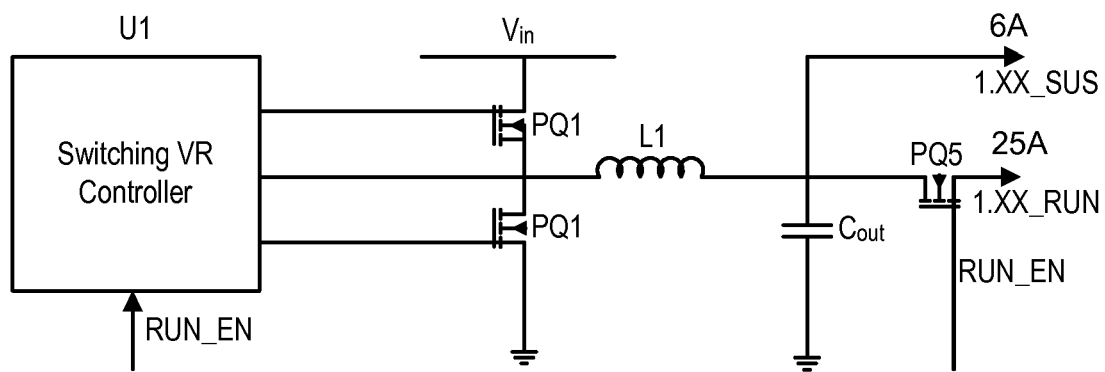
FIG. 1 depicts a circuit diagram of a prior art circuit for supplying power with a single voltage regulator to an information handling system chipset in a suspend and a run power mode.
Figure 2:
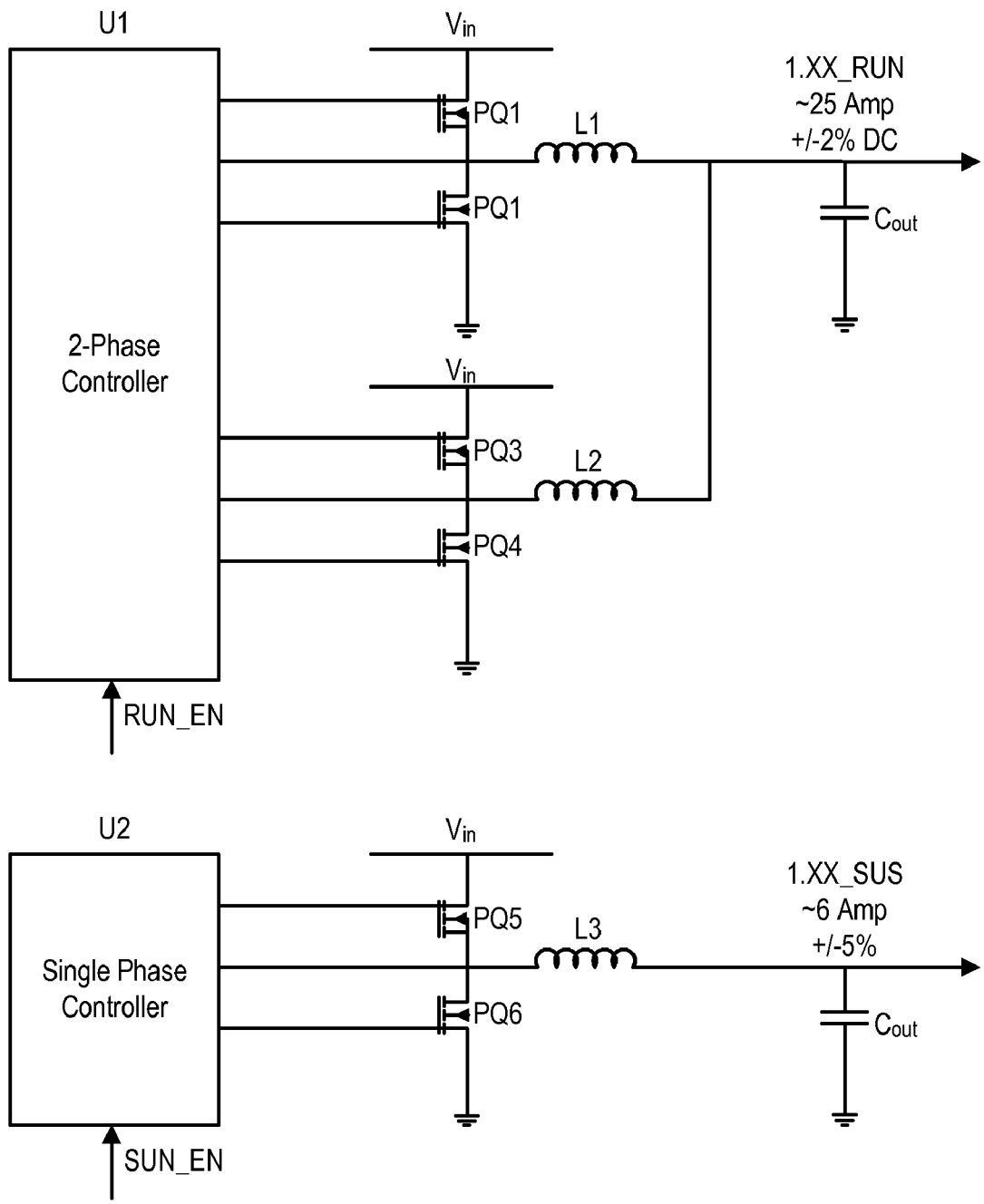
FIG. 2 depicts a circuit diagram of a prior art circuit for supplying power to an information handling system chipset in a suspend and a run power mode with separate voltage regulators.
Figure 4:
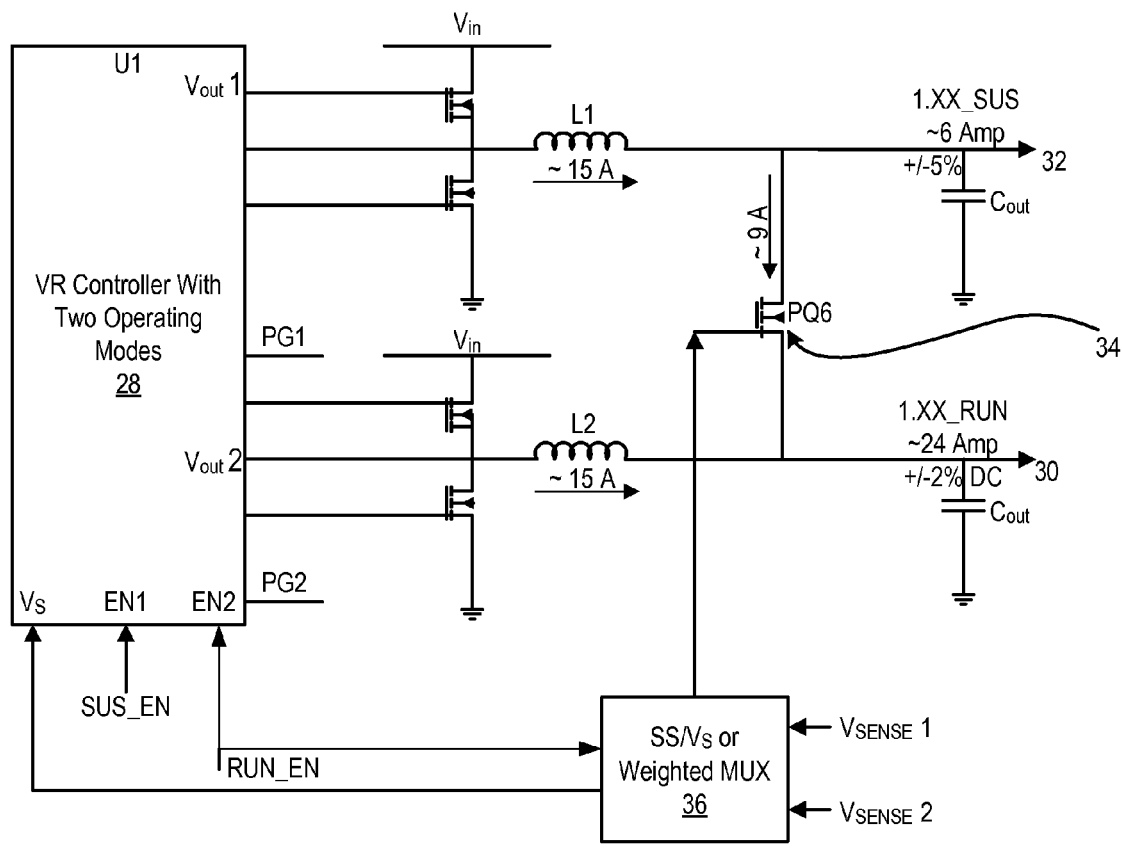
FIG. 4 depicts a circuit diagram of a circuit for supplying power to an information handling system chipset in a suspend power mode and a run power mode with a single dual phase voltage regulator.

Referring now to FIG. 4, a circuit diagram depicts a circuit for supplying power to an information handling system chipset in a suspend power mode and a run power mode with a single dual phase voltage regulator 28. Voltage regulator 28 is, for instance, a two output dual buck circuit or a combinable 2-phase controller. In the example embodiment depicted by FIG. 4, voltage regulator 28 has circuitry similar to that used in FIG. 2 to provide power to a run power state rail 30, however, the example embodiment depicted by FIG. 4 operates with both an independent output Vout1 (1.xx_SUS) to only reduced power state power rail 32 and a combined output from Vout1 and Vout2 (1.XX_RUN) to both reduced power state power rail 32 and run power state rail 30. In one embodiment, each output phase proceeds through its own motherboard power plane. A MOSFET load switch 34 selectively interfaces reduced power state power rail 32 with run power state rail 30 when information handling system 10 is in a run state and selectively disconnects reduced power state power rail 32 from run power state rail 30 when information handling system 10 is in a reduced power state. Some examples of two phase voltage regulators include the Maxim MAX17007 and MAX8775. Voltage regulator 28 operates in the independent mode when SUS_EN provides an enable signal at EN1. Voltage regulator 28 operates in the combined mode with SUS_EN is enabled at EN1 and RUN_EN is enabled at EN2. Each of the run power rail 30 and suspend power rail 32 runs through its own plane of a printed circuit board, such as a mother board, so that the combined mode of operation effectively combines multiples power planes.

During operation, while information handling system 10 is in an S3 state of suspend, power is applied only from Vout1 to the reduced power state rail 32. At initial power up, information handling system 10, voltage rails are sequenced so that reduced power state power rail 32 is turned on first and then run power state rail 30 is turned on next if the intended power state is an S0 run state. During a soft start, PQ6 MOSFET 34 allows run power rail 30 to gradually rise to be close to the voltage of suspend rail 32 and then fully turns on to bring up the second power phase with both Vsense1 and Vsense2 interfaced with controller 28. Vsense 1 provides feedback voltage sensed at the reduced power state rail and Vsense2 provides feedback voltage sensed at the run power state rail. When voltage regulator 28 transitions from a low power state in which a single phase Vout1 outputs power to a run power state in which both phases Vout1 and Vout2 output power, MOSFET load switch 34 closes to interface low power state power rail 32 with run power state rail 30. A voltage sense 1 from low power state power rail 32 and a voltage sense 2 from run power state power rail 30 are accepted via a multiplexer 36 or a weighted sense circuit so that both voltage senses are available to control voltage output from both phases of voltage regulator 28. For example, when running in the combined mode with both the suspend and run power rails having power, a signal at RUN_EN has multiplexer 36 forward both sense voltages to voltage regulator controller 28. Combining the voltage sense values allows proportionally greater regulation influence by run power state power rail 30 to provide more precise voltage levels on run power state rail 30. Reduced power state power rail 32 is allowed to increase proportionally by the current flowing through MOSFET load switch 34. For example, in the example embodiment of FIG. 4, 9 Amps of current is available from the first phase of voltage regulator 28 and 15 Amps of current is available from the second phase of voltage regulator 28. In one embodiment, more precise regulation of the voltage sense on the run state power rail 30, such as within a 2% tolerance, is provided while precision of the voltage sense of reduced power state power rail 32 is maintained within a 5% tolerance. In alternative embodiments, the reduced power rail may receive power from a single phase of a voltage regulator while the second power rail can be an N-phase operation so that the total is N+1 phases.

Although the present invention has been described in detail, it should be understood that various changes, substitutions and alterations can be made hereto without departing from the spirit and scope of the invention as defined by the appended claims.

What is claimed is:

1. An information handling system comprising:
   plural components operable to process information;
   a chipset interfaced with the plural components and operable to coordinate interactions of the plural components;
   a power supply operable to provide power to the plural components and the chipset; and
   a voltage regulator controller interfaced with the power supply and operable to supply power to the chipset, the voltage regulator controller having first and second phases, the first phase interfaced with a first power rail to provide power to the chipset in a first power state, the second phase interfaced with a second power rail to provide power to the chipset in a second power state;
   a switch disposed between the first and second power rails, the switch operable to interface the first and second power rails in the second power state and disconnect the first and second power rails in the first power state;
   a first voltage sense associated with the first power rail and interfaced with the voltage regulator controller; and
   a second voltage sense associate with the second power rail and interfaced with the voltage regulator controller;
   wherein the voltage regulator controller uses the first voltage sense to control output of the first phase in the first power state and combines the first and second voltage senses to control output of the first and second phases in the second power state.

2. The information handling system of claim 1 wherein the voltage regulator controller maintains the first voltage sense within a first constraint and the second voltage sense within a second constraint during the second power state.

3. The information handling system of claim 2 wherein the second constraint is more precise than the first constraint.

4. A method for providing power to electronic components that operate in at least first and second power states, the method comprising:
   powering a first power rail in the first power state with a first phase of a two phase voltage regulator controller;
   powering the first power rail and a second power rail in a second power state, the second power rail powered with a second phase of the two phase voltage regulator controller;
   selectively connecting the first and second power rails when in the second power state;
   feeding back a voltage from the first power rail and the second power rail to the voltage regulator controller during the second power state; and
   controlling the voltage of the first power rail within a first constraint and the voltage of the second power rail with a second constraint.

5. The method of claim 4 wherein the second constraint is more precise than the first constraint.

6. A system for powering electronic components, the system comprising:
   a two phase voltage regulator having a first phase output and a second phase output;
   a MOSFET switch operable to connect the first phase output with the second phase output when both phases are active and to disconnect the first phase output from the second phase output when only the first phase output is active;
   a reduced power state power rail interfaced with the first phase and a run power state power rail interfaced with the second phase; and
   a first voltage sense associated with the reduced power state power rail and a second voltage sense associated with the run power state power rail, the voltage regulator applying both the first and second voltage senses to control both the first and second phases.

* * * * *